United States Patent [19]

Smith, Jr.

[11] Patent Number: 5,557,989

[45] Date of Patent: Sep. 24, 1996

[54] BAND SAW BLADE TENSIONING DEVICE

[76] Inventor: John C. Smith, Jr., 210 Michigan Ave., Gaffney, S.C. 29341

[21] Appl. No.: 390,140

[22] Filed: Feb. 17, 1995

[51] Int. Cl.$^6$ ................................................ B23D 63/02
[52] U.S. Cl. ..................................... 76/74; 76/27
[58] Field of Search ............................. 76/25.1, 27, 50.2, 76/58, 74, 78.1

[56] References Cited

U.S. PATENT DOCUMENTS

| | | | |
|---|---|---|---|
| 735,868 | 8/1903 | Folkers et al. | 76/74 |
| 932,987 | 8/1909 | Hibbert | 76/27 |
| 971,841 | 10/1910 | Hibbert | 76/27 |
| 1,486,440 | 3/1924 | Kramer | 76/78.1 |
| 3,460,407 | 8/1969 | Vollmer | 76/37 |
| 3,802,299 | 4/1974 | Idel | 76/37 |
| 3,929,040 | 12/1975 | Idel | 76/37 |
| 4,064,770 | 12/1977 | Idel | 76/37 |
| 4,587,869 | 5/1986 | Hamer | 76/58 |

*Primary Examiner*—Hwei-Siu Payer
*Attorney, Agent, or Firm*—David L. Baker; Rhodes & Ascolillo

[57] ABSTRACT

A device for securing and tensioning a band saw blade, including a rectangular base member having a longitudinal axis, and a disk member fixedly attached at one end of the base member, the disk member holding a first end of the band saw blade in place. A first pair of parallel blade guides is disposed parallel to the longitudinal axis of the base member for supporting a section of the band saw blade therebetween. A retractable tensioning mechanism is disposed at the other end of the base member, which produces an outwardly directed force on a second end of the band saw blade.

6 Claims, 3 Drawing Sheets

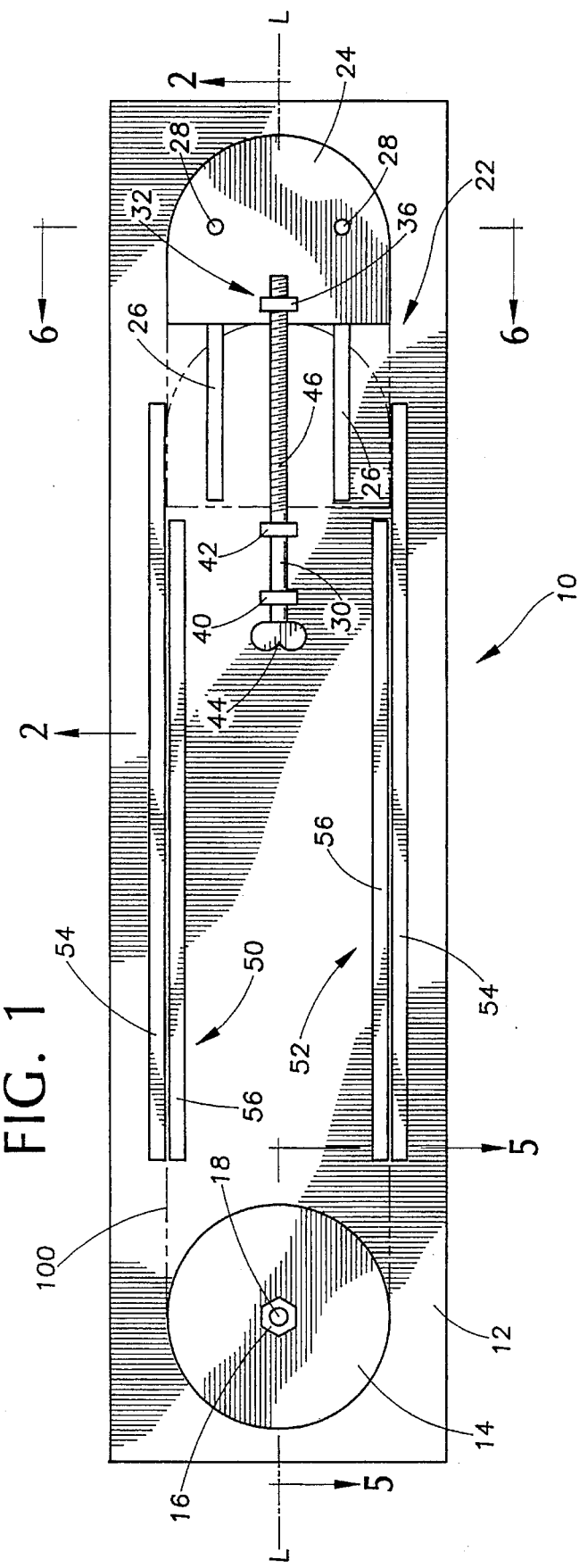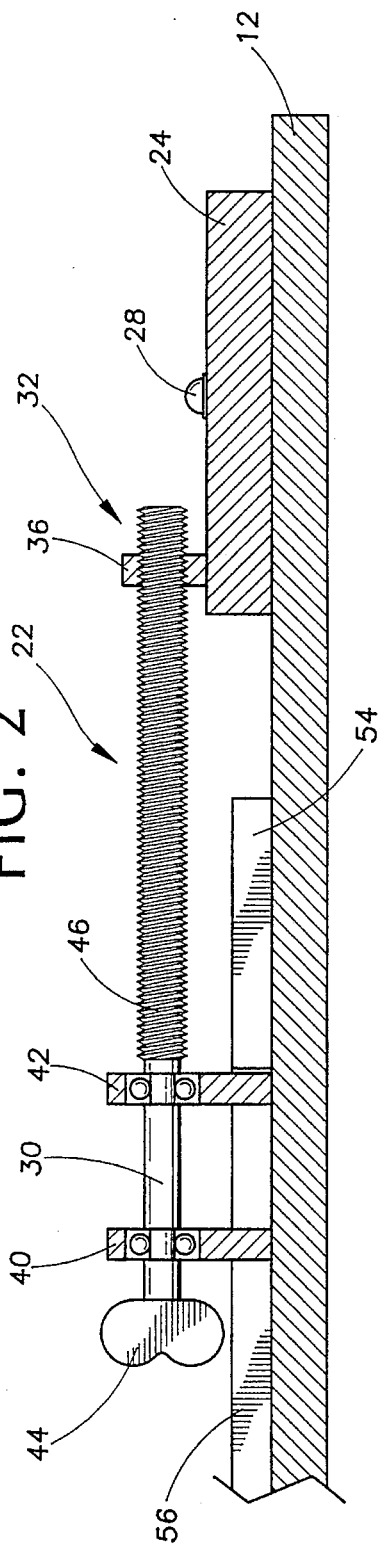

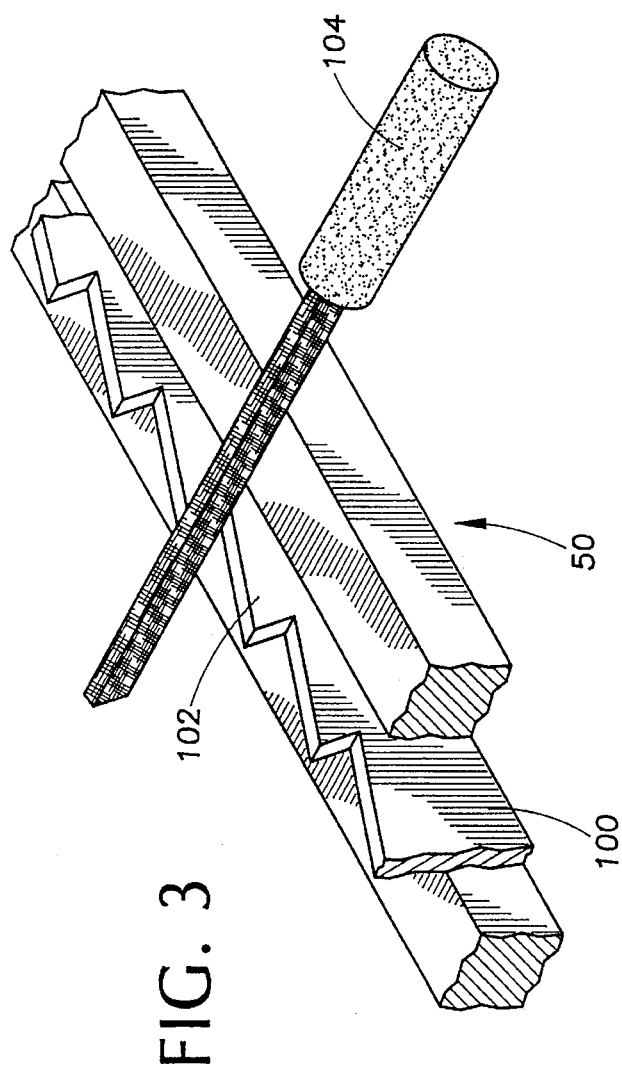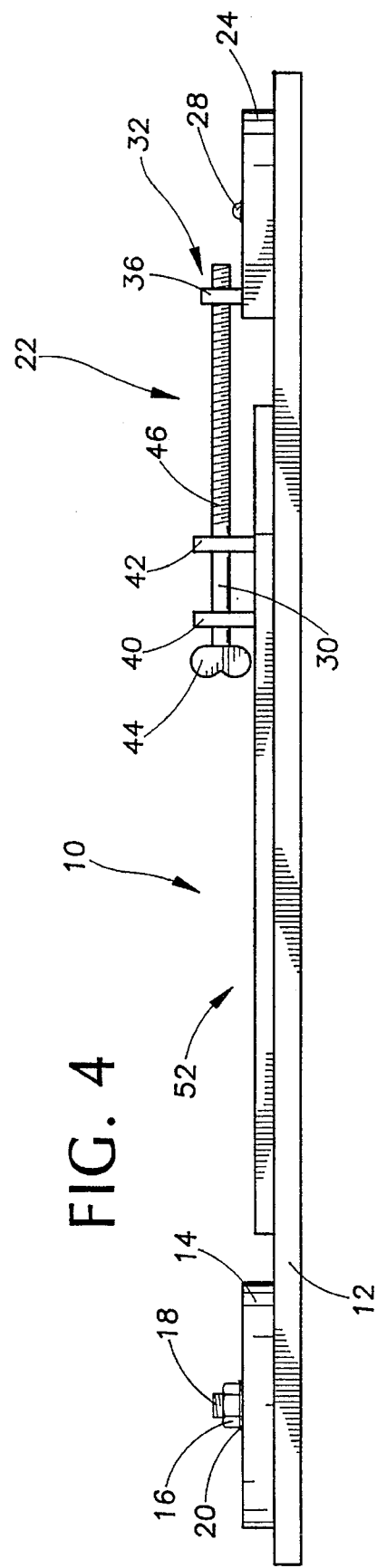

BAND SAW BLADE TENSIONING DEVICE

BACKGROUND OF THE INVENTION

1. Field of the Invention

The present invention relates generally to a device for securing and tensioning a dulled band saw blade for sharpening purposes and, more particularly, to a device providing a retractable tensioning means to accommodate band saw blades of varying sizes.

2. Description of the Related Art

U.S. Pat. No. 3,460,407 issued to U. Volliner on Aug. 12, 1969 relates to a device for sharpening a band saw, including a centrally arranged adjusting device for simultaneously adjusting the heights of all the guide means of the device.

U.S. Pat. No. 3,802,299 issued to V. Idel on Apr. 9, 1974 also discloses a device for sharpening a band saw, including a bed for mounting a grinding mechanism, as well as an in-feed mechanism for moving the band saw blade transversely to the grinding mechanism. In addition, a pitch feed mechanism moves the saw blade longitudinally, while a resilient fixture clamps the blade on the machine's side and back surfaces.

U.S. Pat. No. 3,929,040, also issued to Idel, on Dec. 30, 1975 discloses an improved feed mechanism for his band saw sharpening machine. Supporting elements are used in the machine and are arranged such that they are inclined in the direction of the blade movement through the machine.

U.S. Pat. No. 4,064,770, also issued to Idel, on Dec. 27, 1977 discloses further improvements to the band saw sharpening machine, relating to the quality and finish of the band saw teeth being machined.

Finally, U.S. Pat. No. 4,587,869 issued to G. Hamer on May 14, 1986 discloses a method and apparatus for reconditioning worn band saw blades, particularly those blades having alternating right and left set teeth.

While there exists a multitude of devices for automatically sharpening the circular blade of a band saw machine (as indicated by the above examples), it may be somewhat expensive and impractical for an ordinary homeowner to own or use such a machine. In many cases, a dulled band saw blade is sharpened manually by applying a file, rasp, or other similar tool directly to the teeth of the blade. However, in order to properly sharpen a blade by hand, the blade must be firmly held in place by means of a vise or other securing mechanism. One disadvantage of this method is the relatively long time it takes to sharpen the entire length of the blade, since the blade must be continuously rotated within the narrow width of the vise.

A need, therefore, exists for a device which allows manual sharpening of band saw blades to be accomplished with relative ease by minimizing the number of times the blade must be rotated.

SUMMARY OF THE INVENTION

Accordingly, it is a principal object of the present invention to provide a device which provides a means for holding a band saw blade stationary and under tension while it is being sharpened It is another object of the invention to provide such a device that shortens sharpening time by minimizing the number of times the blade must be shifted before all of its teeth are sharpened.

It is a further object of the invention to provide such a device which is relatively inexpensive to manufacture and which is easy to use.

The present invention achieves the above objects, among others, by providing in one aspect a device for securing and tensioning a band saw blade, including a rectangular base member having a longitudinal axis, and a disk member fixedly attached at one end of the base member, the disk member holding a first end of the band saw blade in place. A first pair of parallel blade guides is disposed parallel to the longitudinal axis of the base member for supporting a section of the band saw blade therebetween. A retractable tensioning mechanism is disposed at the other end of the base member, which produces an outwardly directed force on a second end of the band saw blade.

Preferably, there is a second pair of parallel blade guides which are disposed parallel to the longitudinal axis of the base member, the second pair of blade guides supporting another section of the band saw blade therebetween. Additionally, the tensioning mechanism further includes a block member, rounded at one end, slidingly engaged with the top surface of the base member. A flange, having a threaded aperture, is fastened to the top surface of the block member, and an elongated bolt is horizontally disposed with respect to the base member and is threadingly engaged at its distal end with the threaded aperture. The bolt produces an outwardly directed force on the block member whenever the bolt is twisted in one direction, and produces an inwardly directed force on the block member whenever the bolt is twisted in the opposite direction.

An attaching mechanism slidably attaches the block member to the base member, including a pair of attaching pegs which passes through the block member along with a pair of slots located in the base member. Both the slots and the pegs are T-shaped and the slots are designed for receiving the pair of pegs therein.

Finally, a securing mechanism holds the elongated bolt in a horizontal position, while restricting lateral movement of the bolt along the longitudinal axis of the base member. The securing mechanism includes a pair of vertically disposed support members, each having an opening therethrough for engagement with the proximal end of the elongated bolt.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a top plan view of a band saw blade tensioning device, according to the present invention;

FIG. 2 is a cross-sectional view, taken along lines 2—2 of FIG. 1, illustrating the tensioning mechanism;

FIG. 3 is a partial fragmentary, perspective view of a band saw blade supported by a pair of blade guides, according to the present invention;

FIG. 4 is a front elevational view of the device illustrated in FIG. 1;

DESCRIPTION OF THE PREFERRED EMBODIMENT

Figure 5:
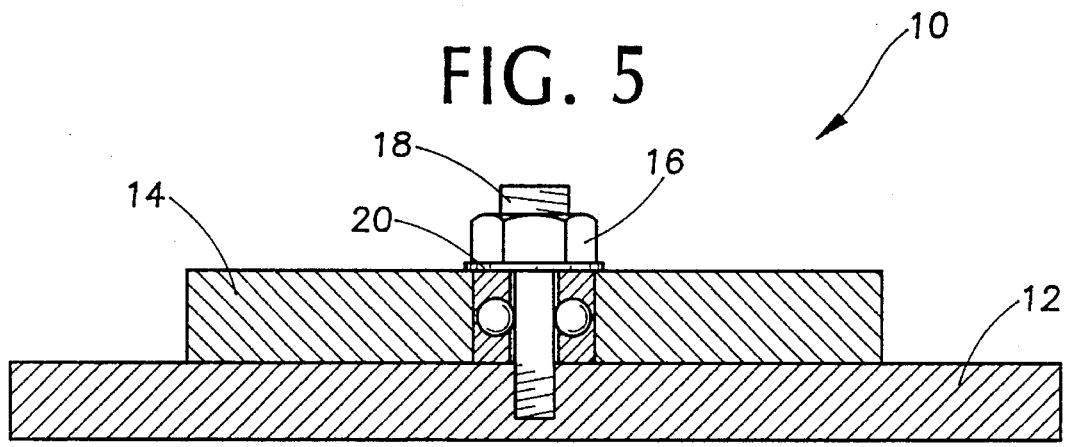
FIG. 5 is a cross-sectional view, taken along lines 5—5 of FIG. 1, illustrating the connection of the disk to the base member.
Figure 6:
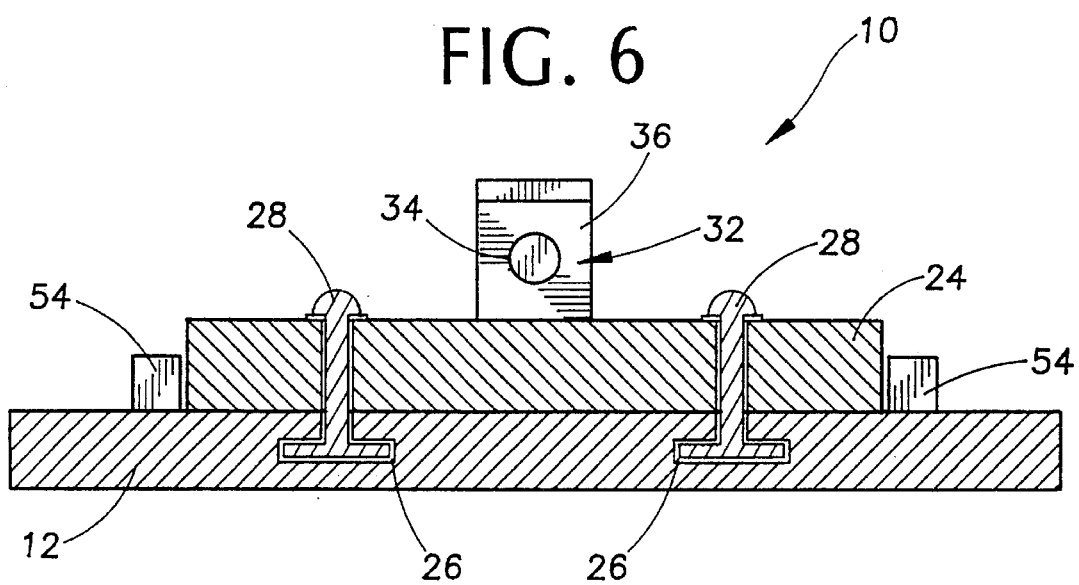
FIG. 6 is a cross-sectional view, taken along lines 6—6 of FIG. 1, illustrating the attachment of the block member to the T-shaped slots.

Referring initially to FIG. 1, there is shown a device for sharpening and tensioning band saw blades, generally designated by the reference numeral 10. Device 10 includes a rectangular base member 12, which is preferably constructed from sturdy wood material, such as oak; however other material substitutes, such as metal, are acceptable as well. A rounded disk 14 is secured to one end of the base member 12 through a nut 16, bolt 18, and washer 20 combination, and is for looping one end of a band saw blade 100 thereon. Positioned at the other end of the base member 12 is a retractable tensioning assembly 22 which provides the necessary tightening force on the blade 100 so that the individual teeth 102 may be sharpened by a file or other similar tool 104 (FIG. 3).

FIGS. 1 and 2 illustrate the tensioning mechanism in greater detail. A block member 24 is slidingly engaged with a pair of T-shaped slots 26 located in the base member 12 by a pair of corresponding T-shaped pegs 28. Movement of the block member 24 is ultimately controlled by an elongated bolt 30, which is engaged at its distal end 32 with a threaded aperture 34 in a flange 36 on the block member 24. The bolt 30 is supported in a horizontal position by a pair of support members 40, 42, with its lateral movement along the horizontal axis L-L of the base member 12 being limited by the wing shaped bolt head 44 at support member 40, and by the threaded portion 46 of the bolt 30 at support member 42. The bolt 30 passes through circular openings (not shown) in both support members 40, 42.

Finally, two pairs of parallel blade guides 50, 52 support opposing sections of the band saw blade 100, as illustrated in FIG. 3. Each pair of guides 50, 52 includes two elongated wooden or metal strips 54, 56 separated by a small gap in order to accommodate a band saw blade therein. It should be noted that the innermost strips 56 of both pairs of blade guides 50, 52 are shorter than the outermost strips 54 at one end, in order to allow the block member 24 to retract to its inner most position, (shown in phantom in FIG. 1).

Operation of the tensioning mechanism 22 is accomplished by manual turning of the bolt 30. As the bolt 30 is rotated in a clockwise direction, the flange 36 and block member 24 are caused to slide inwardly along the slots 26, and allowing a band saw blade 100 to be loosely placed around the outer edge of disk 14, through blade guides 50, 52, and around the edge of block member 24. Tension is then provided by manually turning the bolt 30 in a counterclockwise direction, causing the flange 36 and block member 24 to move outward until the blade 100 is sufficiently tightened. At this point, the individual teeth 102 of band saw blade may be manually sharpened. The relatively long section of the blade 100 supported between the blade guides 50, 52 allows most of the teeth to be sharpened before the blade 100 should be rotated. To rotate the blade 100, the operator need only loosen the tension by twisting the bolt 30 clockwise, shifting the blade position in order to place the unsharpened teeth 102 between the blade guides, and then retightening once again.

It will thus be seen that the objects set forth above, among those elucidated in, or made apparent from, the preceding description, are efficiently attained. Since certain changes may be made in the above construction without departing from the scope of the invention, it is intended that all matter contained in the above description or shown on the accompanying drawing shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A device for securing and tensioning a band saw blade, comprising:

a rectangular base member having a longitudinal axis;

a disk member fixedly attached at an end of the base member, said disk member for holding a first section of the band saw blade in place;

a first pair of parallel blade guides which are disposed parallel to the longitudinal axis of the base member, said first pair of blade guides capable of supporting a second section of the band saw blade therebetween;

retractable tensioning means for producing an outwardly directed force on the band saw blade, said tensioning means disposed at another end of the base member;

a second pair of parallel blade guides which are disposed parallel to the longitudinal axis of the base member, said second pair of blade guides supporting a third section of the band saw blade therebetween;

the tensioning means comprising:

a block member, rounded at one end, slidingly engaged with the top surface of the base member;

a flange, having a threaded aperture and fastened to the top surface of the block member; and an elongated bolt, horizontally disposed with respect to the base member, and threadingly engaged at its distal end with the threaded aperture;

said elongated bolt producing an outwardly directed force on the block member whenever the bolt is rotated in a first direction, and producing an inwardly directed force on the block member whenever the bolt is rotated in a second direction;

said attaching means further comprising:

a pair of attaching pegs, passing through the block member; and a pair of slots located in the base member, said slots for receiving the pair of pegs therein.

2. The device as described in claim 1, wherein the pair of slots are T-shaped.

3. The device as described in claim 1, wherein the pair of pegs are T-shaped.

4. The device as described in claim 1, further comprising a securing means for securing the elongated bolt in a horizontal position, said securing means also restricting lateral movement of the bolt along the longitudinal axis of the base member.

5. The device as described in claim 4, wherein the securing means comprises a pair of vertically disposed support members, each having an opening therethrough for engagement with a proximal end of the elongated bolt.

6. A device for securing and tensioning a band saw blade, comprising:

a rectangular base member having a longitudinal axis;

a disk member fixedly attached at an end of the base member, said disk member for holding a first section of the band saw blade in place;

a first pair of parallel blade guides which are disposed parallel to the longitudinal axis of the base member, said first pair of blade guides capable of supporting a second section of the band saw blade therebetween;

retractable tensioning means for producing an outwardly directed force on the band saw blade, said tensioning means disposed at another end of the base member;

a second pair of parallel blade guides which are disposed parallel to the longitudinal axis of the base member, said second pair of blade guides supporting a third section of the band saw blade therebetween;

the tensioning means comprising:
- a block member, rounded at one end, slidingly engaged with the top surface of the base member;
- a flange, having a threaded aperture and fastened to the top surface of the block member; and
- an elongated bolt, horizontally disposed with respect to the base member, and threadingly engaged at its distal end with the threaded aperture; and said elongated bolt producing an outwardly directed force on the block member whenever the bolt is rotated in a first direction, and producing an inwardly directed force on the block member whenever the bolt is rotated in a second direction.

* * * * *